(12) United States Patent
Isaji

(10) Patent No.: US 7,183,968 B2
(45) Date of Patent: Feb. 27, 2007

(54) FM-CW RADAR SYSTEM

(75) Inventor: Osamu Isaji, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 11/293,332

(22) Filed: Dec. 1, 2005

(65) Prior Publication Data

US 2006/0103571 A1 May 18, 2006

Related U.S. Application Data

(62) Division of application No. 10/646,905, filed on Aug. 22, 2003, which is a division of application No. 10/148,059, filed as application No. PCT/JP01/08397 on Sep. 26, 2001, now Pat. No. 7,002,512.

(30) Foreign Application Priority Data

Sep. 26, 2000 (JP) ............... 2000-292730

(51) Int. Cl.
*G01S 13/93* (2006.01)
(52) U.S. Cl. .................. 342/70; 342/109; 342/112; 342/116; 342/128; 342/159
(58) Field of Classification Search ............ 342/70–73, 342/81, 82, 84, 109, 112, 115, 128, 159, 200
See application file for complete search history.

(56) References Cited

U.S. PATENT DOCUMENTS

| | | |
|---|---|---|
| 3,109,172 A | 10/1963 | Hardinger et al. |
| 4,142,189 A | 2/1979 | Gleason |
| 4,620,192 A | 10/1986 | Collins |

(Continued)

FOREIGN PATENT DOCUMENTS

EP 0 795 761 A2 9/1997

(Continued)

OTHER PUBLICATIONS

European Search Report, dated Dec. 13, 2005 for publication No. EP 0 502 1759.5. in the name of Fujitsu Ten Limited.

(Continued)

*Primary Examiner*—Thomas H. Tarcza
*Assistant Examiner*—Isam Alsomiri
(74) *Attorney, Agent, or Firm*—Christie, Parker & Hale, LLP.

(57) ABSTRACT

In an FM-CW radar system, a frequency modulating said modulating wave output from said modulating signal generator has a frequency variation skew with respect to a time axis (modulation skew), and the radar system includes a means for varying the modulation skew by controlling the modulation frequency amplitude or modulation period of the modulating signal. The radar system further includes a means for discriminating a signal component varying in response to the variation of the modulation skew, thereby discriminating a signal related to a target object from other signals. In the case of an FM-CW radar system that performs transmission and/or reception by time division ON-OFF control the radar system includes a means for discriminating a signal which, when the frequency used to perform the ON OFF control is varied, varies in response to the variation of the frequency, thereby discriminating a signal related to a target object from other signals.

3 Claims, 15 Drawing Sheets

U.S. PATENT DOCUMENTS

| | | |
|---|---|---|
| 4,739,330 A | 4/1988 | Lazarus |
| 4,895,441 A | 1/1990 | Allen, Jr. |
| 4,935,742 A | 6/1990 | Marin |
| 5,274,380 A | 12/1993 | Yatsuka et al. |
| 5,381,153 A | 1/1995 | Saito et al. |
| 5,387,917 A | 2/1995 | Hager et al. |
| 5,612,699 A | 3/1997 | Yamada |
| 5,652,589 A | 7/1997 | Ono et al. |
| 5,717,399 A | 2/1998 | Urabe et al. |
| 5,973,636 A | 10/1999 | Okubo et al. |
| 6,031,483 A | 2/2000 | Urabe et al. |
| 6,067,038 A | 5/2000 | Uehara et al. |
| 6,087,980 A | 7/2000 | Saryo |
| 6,097,331 A | 8/2000 | Matsugatani et al. |
| 6,476,755 B1 | 11/2002 | Senio et al. |

FOREIGN PATENT DOCUMENTS

| | | | |
|---|---|---|---|
| EP | 0 795 761 A3 | 9/1997 |
| EP | 0 916 968 A2 | 5/1999 |
| EP | 0 916 968 A3 | 5/1999 |
| JP | 2-212791 | 8/1990 |
| JP | 2-212793 | 8/1990 |
| JP | 5-297122 | 11/1993 |
| JP | 8-005733 | 1/1996 |
| JP | 8-136647 | 5/1996 |
| JP | 8-327728 | 12/1996 |
| JP | 9-145826 | 6/1997 |
| JP | 9-211112 | 8/1997 |
| JP | 11-231044 | 8/1997 |
| JP | 10-020025 | 1/1998 |

OTHER PUBLICATIONS

European Search Report dated Dec. 16, 2005 for publication No. EP 05 02 1760.3, in the name of Fujitsu Ten Limited.

Copy of Supplementary Partial European Search Report of corresponding European Patent Application No. 01 97 0232, dated Sep. 13, 2004.

European Search Report, dated Feb. 3, 2004, for publication No. 01970232.3, in the name of Fujitsu Ten Limited.

Fig.5
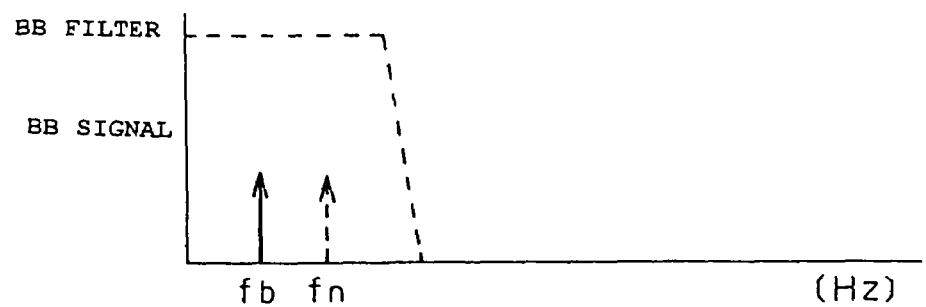
Fig.6
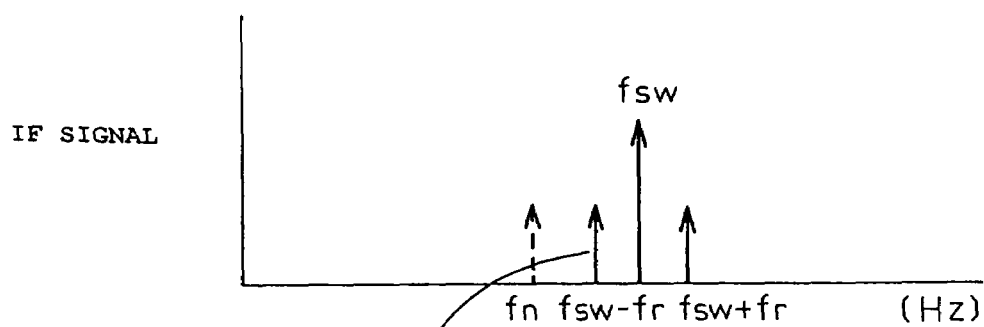
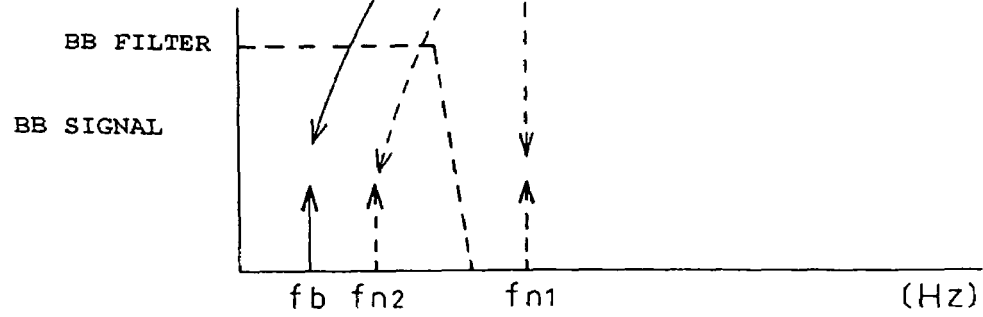

Fig.17
(a)
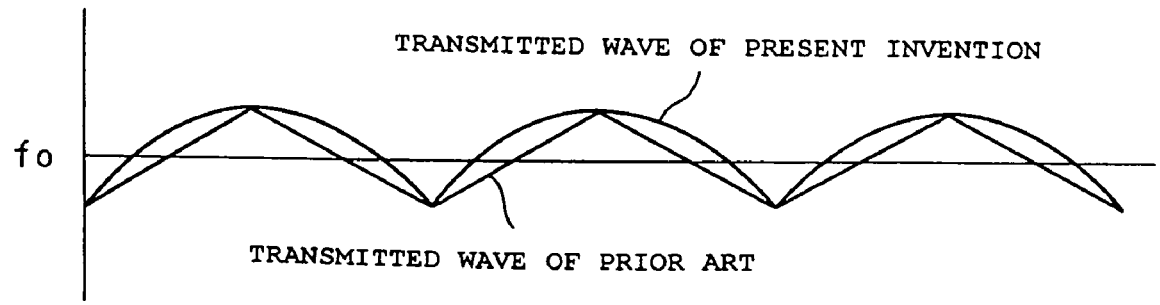
(b)
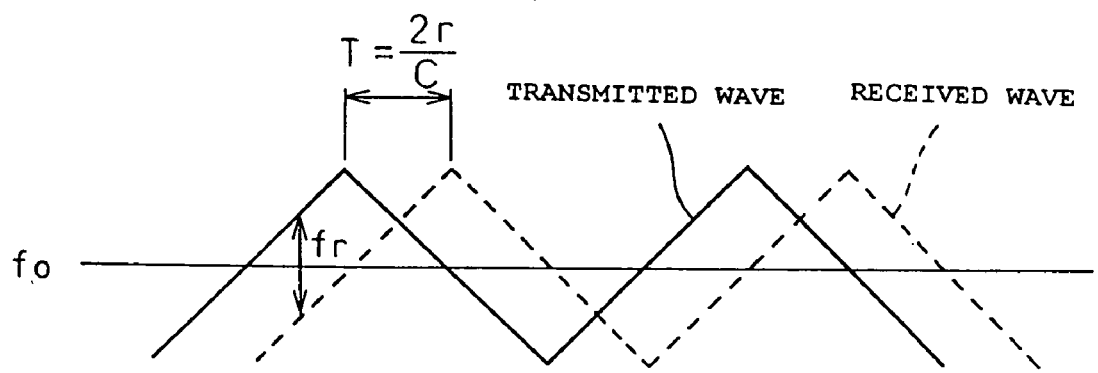
(c)
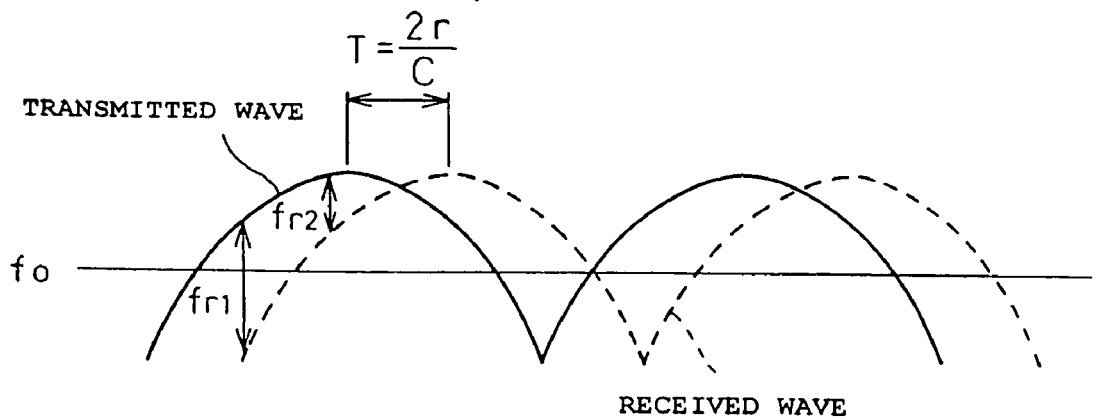

FM-CW RADAR SYSTEM

CROSS-REFERENCE TO RELATED APPLICATION(S)

This application is a divisional of U.S. application Ser. No. 10/646,905, filed Aug. 22, 2003, which is a divisional of U.S. application Ser. No. 10/148,059, filed May 24, 2002 now U.S. Pat. No. 7,002,512, which is the National Stage of International Patent Application No. PCT/JP01/08397, filed Sep. 26, 2001, which in turn claims priority of Japanese Patent Application No. 2000-292730, filed on Sep. 26, 2000.

TECHNICAL FIELD

The present invention relates to an FM-CW radar system and, more particularly, to a system equipped with a means for discriminating a signal related to a target object from noise and a signal from a very distant target in order not to erroneously detect noise, a very distant target, or the like, as a target object.

Background Art

FM-CW radar is used as a radar system for measuring the distance and the relative velocity of a target object. As FM-CW radar can measure the distance and the relative velocity of a vehicle traveling in front by using a simple signal processing circuit, and as its transmitter and receiver can be constructed with simple circuitry, this type of radar is used as an automotive collision avoidance radar.

The principle of FM-CW radar is as follows. An oscillator is frequency-modulated, for example, by a triangular wave of several hundred hertz, and the frequency-modulated wave is transmitted; then, a reflected signal from a target object is received, and the received signal is frequency-demodulated using the frequency-modulated wave as the local frequency. Here, the reflected wave from the target is shifted in frequency from the transmitted signal (i.e., produces a beat) according to the distance between the radar and the target and also to the Doppler shift due to the relative velocity of the target. The distance and the relative velocity of the target object can be measured from this frequency shift.

In an FM-CW radar system, a triangular wave is often used as the modulating signal, and the description given herein deals with the case where a triangular wave is used as the modulating signal, but it will be appreciated that a modulating wave of another shape, such as a sawtooth wave or a trapezoidal wave, can be used instead of the triangular wave.

FIG. 1 is a diagram for explaining the principle of FM-CW radar when the relative velocity with respect to the target object is 0. The transmitted wave is a triangular wave whose frequency changes as shown by a solid line in part (a) of FIG. 1. In the figure, $f_0$ is the transmit center frequency of the transmitted wave, $\Delta f$ is the FM modulation amplitude, and Tm is the repetition period. The transmitted wave is reflected from the target object and received by an antenna; the received wave is shown by a dashed line in part (a) of FIG. 1. The round trip time T of the radio wave to and from the target object is given by $T=2r/C$, where r is the distance to the target object and C is the velocity of propagation of the radio wave.

Here, the received wave is shifted in frequency from the transmitted signal (i.e., produces a beat) according to the distance between the radar and the target object.

The beat frequency component fb can be expressed by the following equation.

$$fb = fr = (4 \cdot \Delta f / C \cdot Tm) r \quad (1)$$

FIG. 2, on the other hand, is a diagram for explaining the principle of FM-CW radar when the relative velocity with respect to the target object is v. The frequency of the transmitted wave changes as shown by a solid line in part (a) of FIG. 2. The transmitted wave is reflected from the target object and received by an antenna; the received wave is shown by a dashed line in part (a) of FIG. 2. Here, the received wave is shifted in frequency from the transmitted signal (i.e., produces a beat) according to the distance between the radar and the target object. In this case, as the relative velocity with respect to the target object is v, a Doppler shift occurs, and the beat frequency component fb can be expressed by the following equation.

$$fb = fr \pm fd = (4 \cdot \Delta f / C \cdot Tm) r \pm (2 \cdot f_0 / C) v \quad (2)$$

In the above equations (1) and (2), the symbols have the following meanings.

fb: Transmission/reception beat frequency
fr: Range (distance) frequency
fd: Velocity frequency
$f_0$: Center frequency of transmitted wave
$\Delta f$: Frequency modulation amplitude
Tm: Period of modulated wave
C: Velocity of light (velocity of radio wave)
T: Round trip time of radio wave to and from target object
r: Range (distance) to target object
v: Relative velocity with respect to target object In an FM-CW radar system, however, there are cases where not only the signal reflected from the target object but noise and a signal from a target located at medium or long range are also detected. This can lead to an erroneous detection which indicates that the target object is at a distance different from the actual distance.

An object of the present invention is to provide a radar system which, even in the presence of noise or a signal from a target located at medium or long range, can identify whether the signal appearing on the radar is the signal from the target object or is noise or a signal from some other source, and can thus determine whether the distance to the target object has been correctly measured.

DISCLOSURE OF THE INVENTION

In an FM-CW radar system according to the present invention, the modulating wave output from a modulating signal generator has a skew with respect to the time axis (hereinafter called the "modulation skew") like a triangular wave, for example, and the radar system includes a means for varying the modulation skew, wherein the modulation skew is varied by varying, for example, the amplitude or the period. When the modulation skew is varied, the frequency of the signal related to the target object varies in response to the variation of the modulation skew; in view of this, the radar system further includes a means for discriminating a signal component varying in response to the variation of the modulation skew, thereby enabling the signal related to the target object to be discriminated from other signals.

In the case of an FM-CW radar system that performs transmission and/or reception by time division ON-OFF control, when the frequency used to perform the ON-OFF control is varied, the frequency of the signal related to the target object varies in response to the variation of the ON-OFF control frequency; in view of this, the time division ON-OFF control type radar system includes a means for discriminating a signal varying in response to the variation of the ON-OFF control frequency, thereby enabling the signal related to the target object to be discriminated from other signals.

In a heterodyne FM-CW radar system, there is provided a means for discriminating a signal which, when the frequency of an IF signal, i.e., a downconverted signal, is varied, varies in response to the variation of that frequency, thereby enabling the signal related to the target object to be discriminated from other signals.

The modulating signal is a signal in the form of a triangular wave, and the modulation skew, the transmission/reception switching frequency, or the IF signal frequency is varied for each pair of the upward and downward slopes of the triangular wave or every plurality of pairs, or for each of the upward and downward slopes of the triangular wave.

Further, in an FM-CW radar system that performs transmission and/or reception by time division ON-OFF control, there is provided a means for varying a pattern, including the duty cycle of the time division ON-OFF control, thereby suppressing signal generation due to targets other than the target object.

The frequency modulation is made to vary nonlinearly, for example, in the form of an arc, with provisions made to discriminate the target object based on the frequency distribution of the received signal related to the target.

Furthermore, the modulation skew is switched randomly by the modulation skew varying means.

ADVANTAGEOUS EFFECT OF THE INVENTION

According to the present invention, by varying the modulation skew, for example, in amplitude and in period, by controlling the modulating signal and by discriminating the signal component varying in response to the variation of the modulation skew, it can be easily determined whether the received signal is a signal related to the target object.

In the case of an FM-CW radar that performs transmission and/or reception by time division ON-OFF control, the frequency used to perform the ON-OFF control is varied and, by discriminating the signal component varying in response to the variation of that frequency, it can be easily determined whether the received signal is a signal related to the target object.

In the case of a heterodyne FM-CW radar, the frequency of the IF signal is varied and, by discriminating the signal component varying in response to the variation of that frequency, it can be easily determined whether the received signal is a signal related to the target object.

Further, in the case of an FM-CW radar system that performs transmission and/or reception by time division ON-OFF control, signal generation due to targets other than the target object can be suppressed by varying the pattern of the time division ON-OFF control.

The frequency modulation is made to vary nonlinearly and, based on the frequency distribution of the received signal related to the target, it can be determined whether the received signal is a signal related to the target object.

As described above, according to the present invention, the signal from the target object can be discriminated and unwanted signals suppressed with simple circuitry.

BRIEF DESCRIPTION OF THE DRAWINGS

FIG. 5 is a diagram showing the frequency spectrum of the baseband signal in the FM-CW radar of FIG. 3.

FIG. 6 is a diagram showing the frequency spectra of the IF signal and baseband signal, respectively, in the time division ON-OFF control type FM-CW radar of FIG. 4.

FIG. 17 is a diagram showing transmitted and received waveforms according to an embodiment of the present invention.

DETAILED DESCRIPTION OF THE INVENTION

Figure 3:
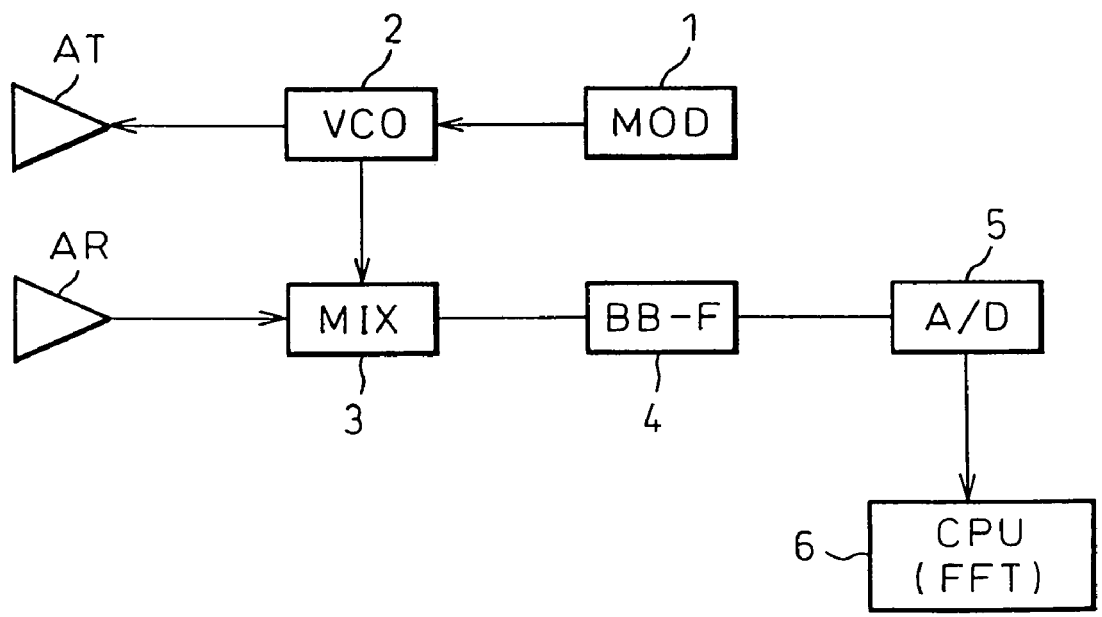
FIG. 3 is a diagram showing one configuration example of a two-antenna FM-CW radar.

The present invention will be described in further detail below with reference to drawings. FIG. 3 is a diagram showing one configuration example of a two-antenna FM-CW radar. As shown, a modulating signal generator 1 applies a modulating signal to a voltage-controlled oscillator 2 for frequency modulation, and the frequency-modulated wave is transmitted out via the transmitting antenna AT, while a portion of the transmitted signal is separated and fed to a frequency converter 3 which functions like a mixer. The signal reflected from a target object, such as a vehicle traveling in front, is received via the receiving antenna AR, and the received signal is mixed in the frequency converter 3 with the output signal of the voltage-controlled oscillator 2 to produce a beat signal. The beat signal is passed through a baseband filter 4, and is converted by an A/D converter 5 into an digital signal; the digital signal is then supplied to a CPU 6 where signal processing, such as a fast Fourier transform, is applied to the analog signal to obtain the distance and the relative velocity.

Figure 4:
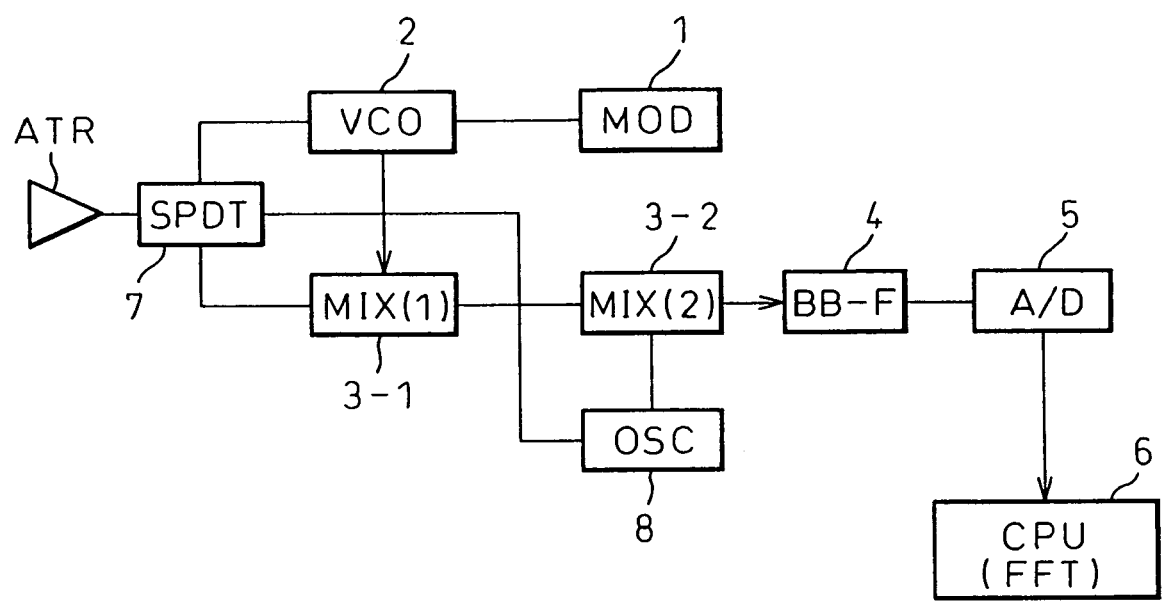
FIG. 4 is a diagram showing one configuration example of a single-antenna time division ON-OFF control type FM-CW radar.

FIG. 4 is a diagram showing one configuration example of a single-antenna time division ON-OFF control type FM-CW radar. As shown, a single antenna ATR is used for both transmission and reception, and a transmit-receive switching device 7 comprising a switching means switches between transmission and reception by time division ON-OFF control. At the receiver side are provided a first frequency converter 3-1 and a second frequency converter 3-2.

A signal output from the transmit-receive switching device 7 is efficiently radiated into the air from the transmitting/receiving antenna ATR. Reference numeral 8 is a modulating signal generator which generates a modulating signal of frequency fsw for switching the transmit-receive switching device 7. The signal reflected from the target object is received by the transmitting/receiving antenna ATR, and the received signal is mixed in the first frequency converter 3-1 with the output of the voltage-controlled oscillator 2 to produce an IF signal. The signal output from the first frequency converter 3-1 is mixed in the second frequency converter 3-2 with the signal of frequency fsw generated by the modulating signal generator 8, and down-converted to produce a signal carrying information on the distance and relative velocity with respect to the target object.

FIG. 5 is a diagram showing the spectrum of the BB signal passed through the baseband filter 4 in the FM-CW radar of FIG. 3.

As shown in FIG. 5, however, noise fn may appear in addition to the signal fb from the target object, and this noise may be erroneously detected as the signal from the target object.

FIG. 6 is a diagram showing the spectrum of the IF signal, i.e., the output signal of the first frequency converter 3-1, and the spectrum of the BB signal passed through the baseband filter 4 in the time division ON-OFF control type FM-CW radar of FIG. 4. The output signal of the first frequency converter 3-1 in FIG. 4 contains the frequency fsw and its sideband frequencies fsw−fr and fsw+fr, as shown in FIG. 6(*a*). Here, fsw is the switching frequency of the transmit-receive switching device 7, and fr is the frequency due to the range to the target object when the relative velocity is zero. The greater the distance to the target object, the farther the sideband frequencies are spaced away from fsw. This output signal is mixed in the second frequency converter 3-2 with the signal of frequency fsw and down-converted to a frequency equal to the difference between the frequencies fsw and fsw±fr to extract the signal fb, which is passed through the BB filter and fed as the BB signal to the A/D converter 5. At this time, however, a noise signal fn may appear in the vicinity of the switching frequency fsw in the IF signal frequency band, as shown in FIG. 6(*a*). In that case, the noise signal directly enters the BB band and appears as fn1, or is downconverted and appears as fn2 in the BB band.

Figure 7:
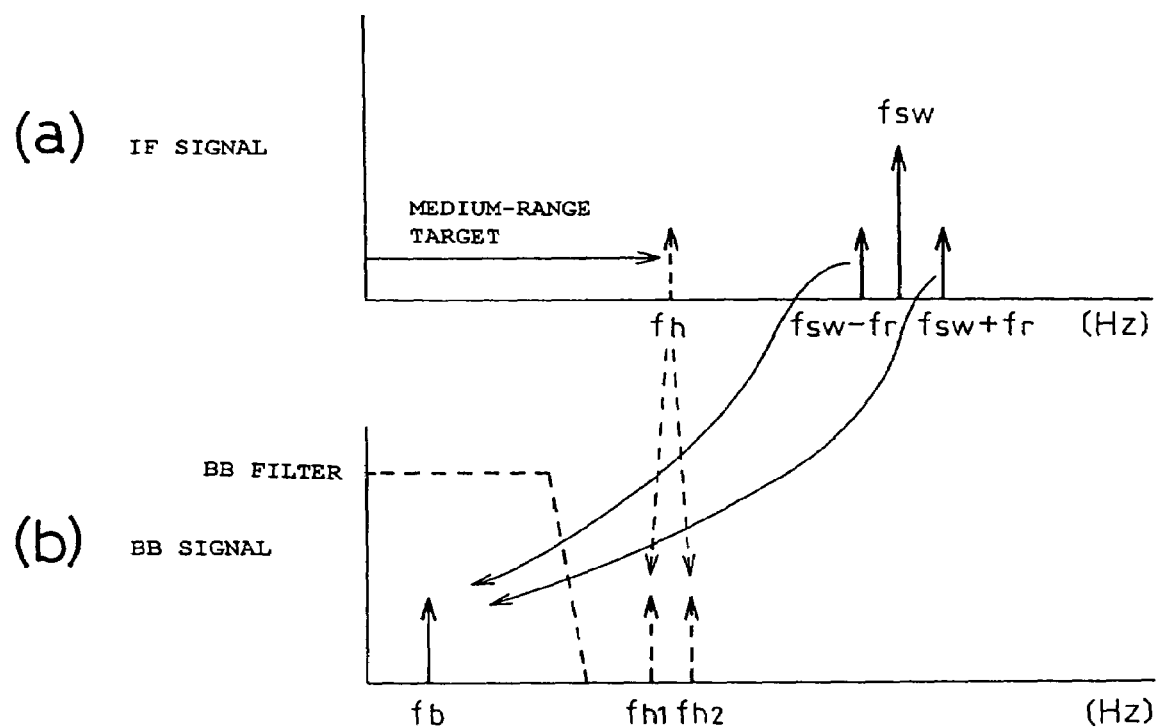
FIG. 7 is a diagram showing the frequency spectra of the IF signal and baseband signal, respectively, in the time division ON-OFF control type FM-CW radar of FIG. 4.

FIG. 7 is a diagram showing the spectrum of the IF signal, i.e., the output signal of the first frequency converter 3-1, and the spectrum of the BB signal passed through the baseband filter in the time division ON-OFF control type FM-CW radar of FIG. 4. As shown in FIG. 7(*a*), a homodyne component of a signal from a medium-range target, which is not the target object, enters the IF signal frequency band and appears as signal fh which, in the beat signal band, appears as signals fh1 and fh2. In this case, these signals are eliminated by the BB filter since their frequencies are higher than the BB band.

Figure 8:
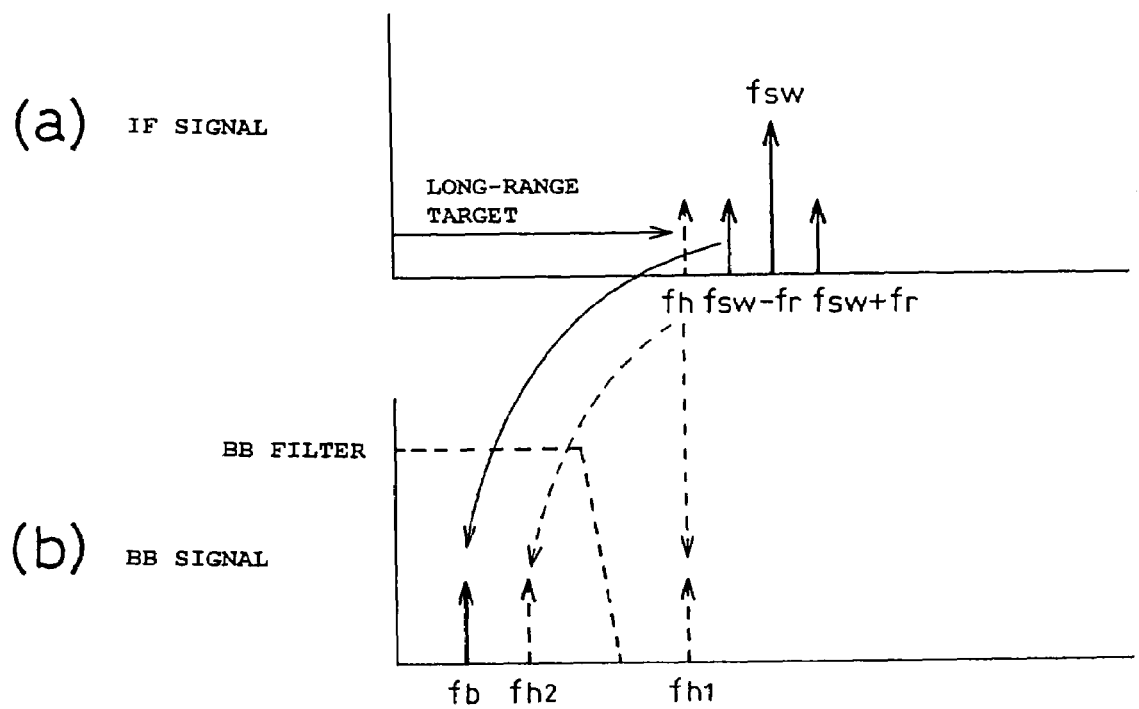
FIG. 8 is a diagram showing the frequency spectra of the IF signal and baseband signal, respectively, in the time division ON-OFF control type FM-CW radar of FIG. 4.

FIG. 8 is a diagram showing the spectrum of the IF signal, i.e., the output signal of the first frequency converter 3-1, and the spectrum of the BB signal passed through the baseband filter in the time division ON-OFF control type FM-CW radar of FIG. 4. As shown in FIG. 8(*a*), when there is a long-range target, its homodyne component enters the IF frequency band and appears as signal fh. This signal appears as signal fh1 in the beat signal band and as signal fh2 in the BB band, as shown in FIG. 8(*a*). In this case, the signal fh1 is eliminated by the BB filter as the frequency is higher than the BB band. However, the signal fh2 is not eliminated by the BB filter, and this signal, though it is a noise component, may be erroneously detected by determining that there is a target object at a distance nearer than it actually is.

Figure 9:
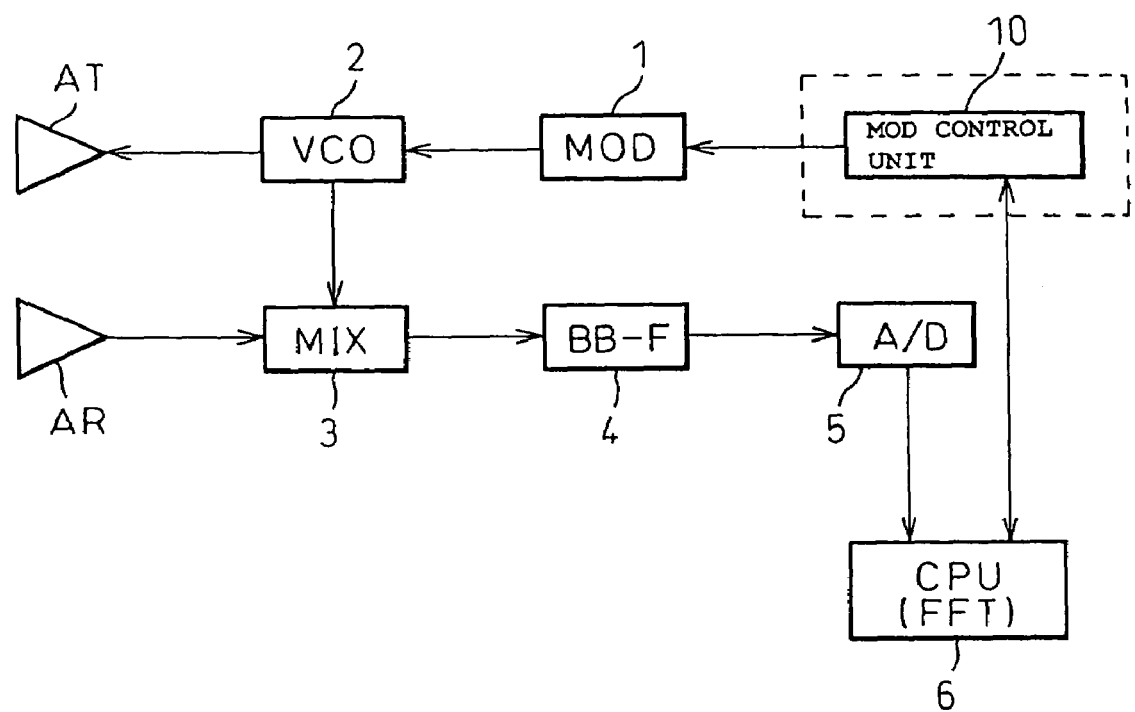
FIG. 9 is a diagram showing an embodiment of an FM-CW radar according to the present invention.

FIG. 9 is a diagram showing an embodiment of an FM-CW radar system according to the present invention. The configuration is the same as that of FIG. 3, except for the inclusion of a modulating signal generator control unit 10. In this figure, the control unit 10, under the control of the CPU 6, variably controls the skew in, for example, amplitude or period, of the modulating signal to be output from the modulating signal generator 1.

Figure 1:
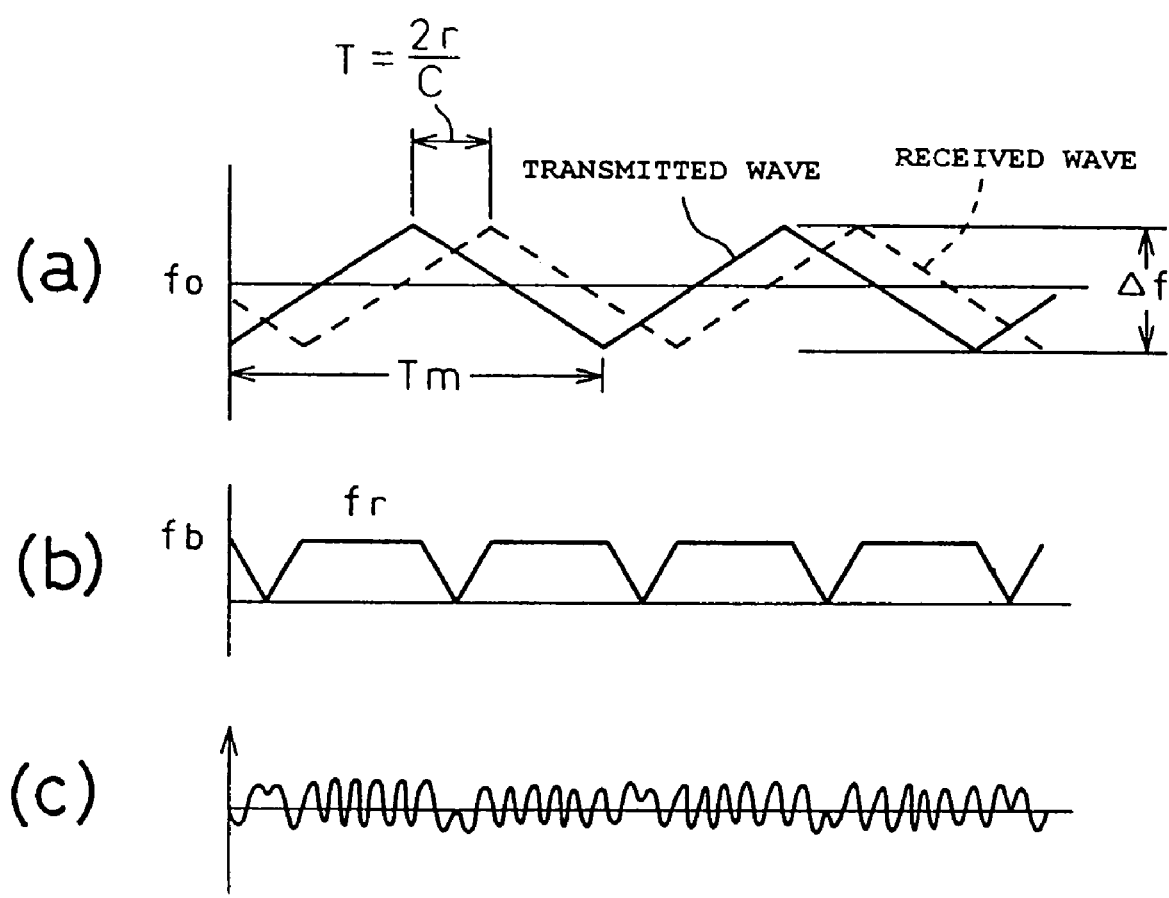
FIG. 1 is a diagram for explaining the principle of FM-CW radar when the relative velocity with respect to target object is 0.

First, the present invention will be described by dealing with the case of variably controlling the amplitude of the modulating signal. As previously described with reference to FIG. 1, when the relative velocity with respect to the target object is 0, the frequency of the transmitted wave changes as shown by the solid line in part (a) of FIG. 1. The transmitted wave is reflected from the target object and received by the antenna, the received wave being shown by the dashed line in part (a) of FIG. 1. Here, the received wave is shifted in frequency from the transmitted signal (i.e., produces a beat) according to the distance between the radar and the target object. The beat frequency component fb can be expressed by equation (1) as previously described.

$$fb = fr = (4 \cdot \Delta f / C \cdot Tm) r \quad (1)$$

Figure 10:
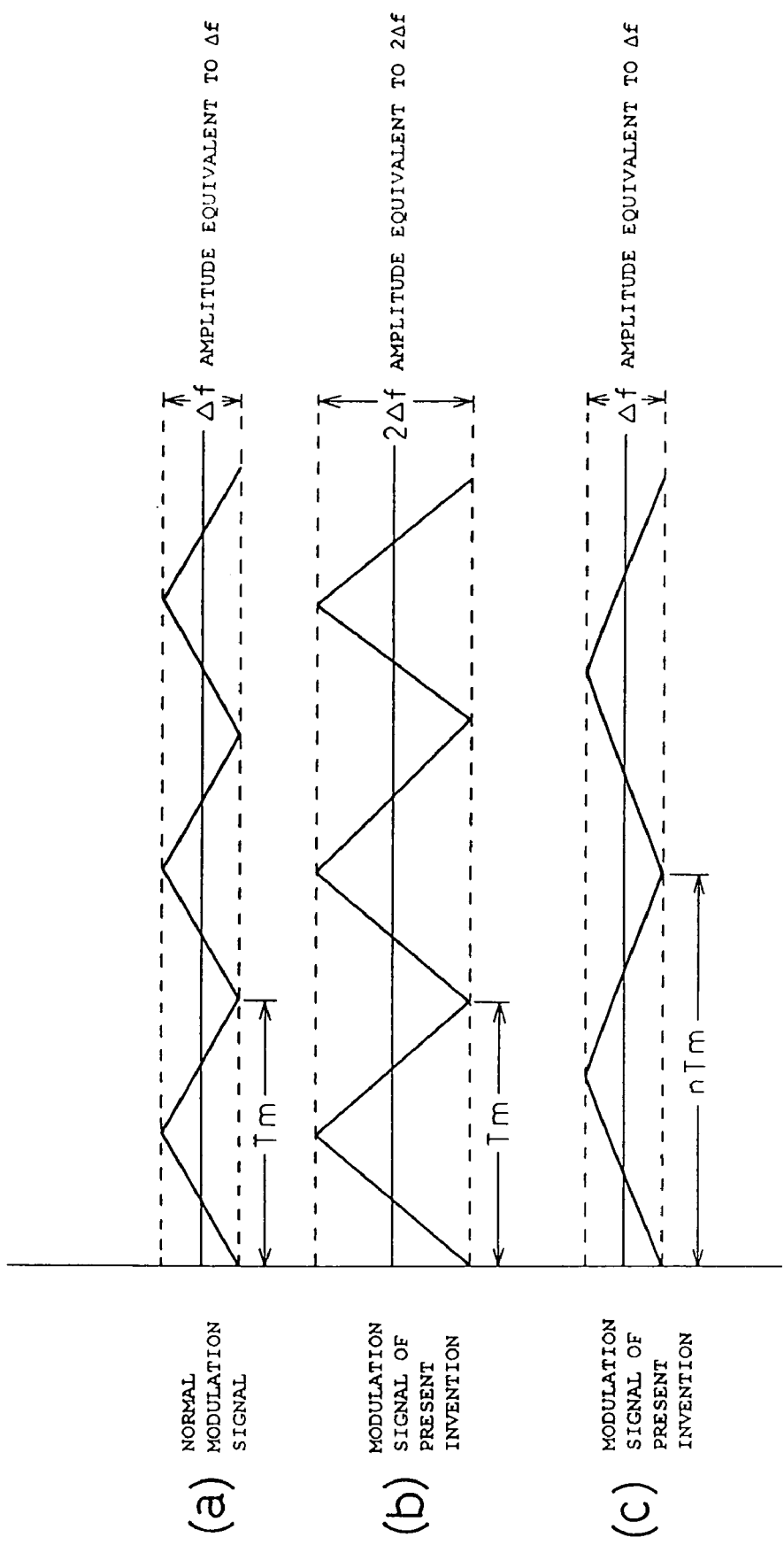
FIG. 10 is a diagram showing a triangular wave when the amplitude and period of the triangular wave are respectively varied in the FM-CW radar according to the present invention.

From equation (1), it will be noted that Δf represents the frequency modulation amplitude, and that Δf can be varied by varying the amplitude of the modulating signal. For example, when the amplitude of the modulating signal is doubled, Δf is doubled and, from equation (1), fb is also doubled. FIG. 10 is a diagram showing a triangular wave used as the modulating signal when its amplitude is varied. Part (a) shows the triangular wave with the normal amplitude (equivalent to Δf), and part (b) shows the triangular wave with its amplitude doubled (equivalent to 2Δf).

In the FM-CW radar system of FIG. 9, when the amplitude of the modulating signal is varied by n times by controlling the modulating signal generator 1 from the control unit 10, the value of the beat frequency component fb varies by n times, as described above. As shown in FIG. 5, the received signal contains the noise signal fn as well as the signal fb from the target object. Here, by controlling the modulating signal generator 1 from the control unit 10, the amplitude of the triangular wave frequency is varied to vary Δf by n times. As a result, the frequency fb of the signal from the target object varies by n times in response to the variation of Δf. However, as the frequency fn of the noise signal remains unchanged, it becomes possible to discriminate which signal is the signal from the target object. This discrimination is done by the CPU 6 in the FM-CW radar. The discrimination described below is also done by the CPU 6.

Next, a description will be given of the case of variably controlling the period of the modulating signal.

From equation (1), it will be noted that Tm represents the period of the modulating signal. Accordingly, when the period Tm of the modulating signal is varied, for example, by n times, the beat frequency component fb varies by 1/n times. FIG. 10(*c*) is a diagram showing a triangular wave used as the modulating signal when its period is varied. Part (a) shows the triangular wave with the normal period Tm, and part (c) shows the triangular wave with a period nTm which is n times the normal period Tm.

In the FM-CW radar system of FIG. 9, when the period of the modulating signal is varied to the period nTm, n times the normal period Tm, by controlling the modulating signal generator 1 from the control unit 10, the value of the beat frequency component fb varies by 1/n times. Here, by controlling the modulating signal generator 1 from the control unit 10, the period of the triangular wave frequency is varied to vary Tm by n times. As a result, the frequency fb of the signal from the target object varies by 1/n times in response to the variation of Tm. However, since the frequency fn of the noise signal remains unchanged, it becomes possible to discriminate which signal is the signal from the target object.

Figure 2:
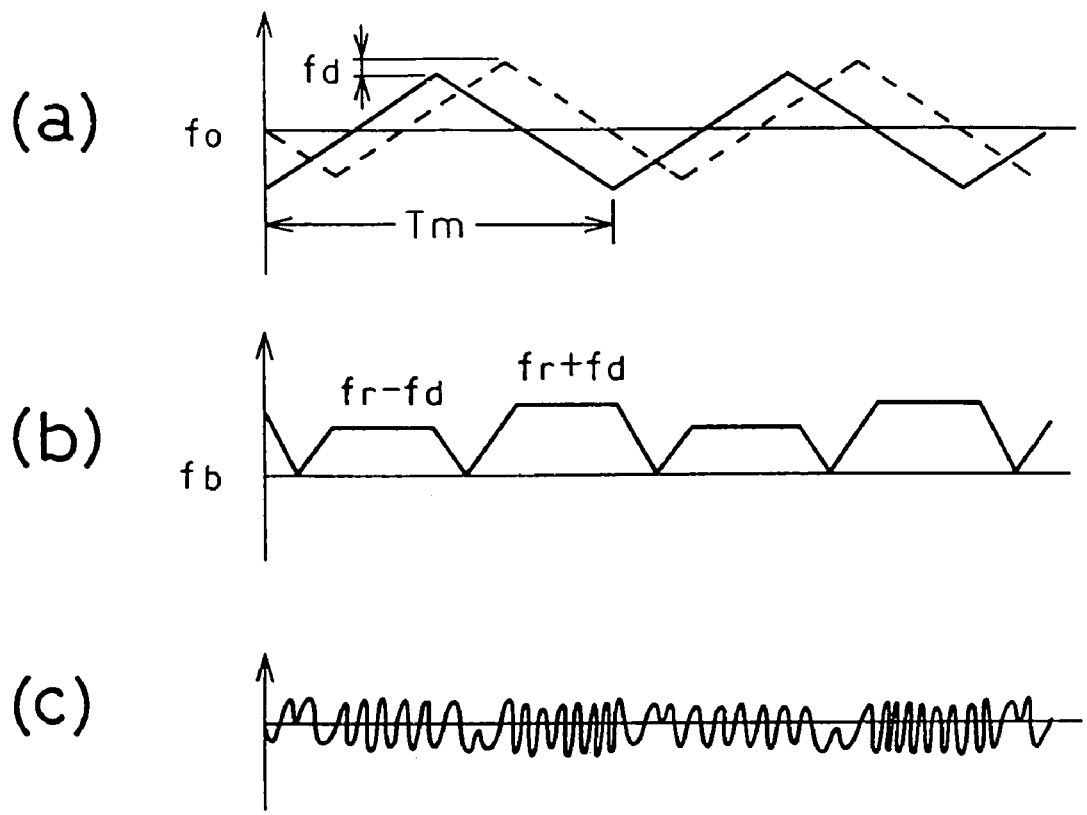
FIG. 2 is a diagram for explaining the principle of FM-CW radar when the relative velocity with respect to target object is v.

As shown in FIG. 2, when the relative velocity with respect to the target is v, the frequency of the transmitted wave changes as shown by the solid line in part (a) of FIG. 2. The transmitted wave is reflected from the target object and received by the antenna, the received wave being shown by the dashed line in part (a) of FIG. 2. Here, the received wave is shifted in frequency from the transmitted signal (i.e., produces a beat) according to the distance between the radar and the target object. The beat frequency component fb can be expressed by equation (2) as previously described.

$$fb = fr \pm fd = (4 \cdot \Delta f/C \cdot Tm)r \pm (2 \cdot f_0/C)v \qquad (2)$$

In this case also, by noting $\Delta f$ or Tm, the amplitude or period Tm of the modulating signal is varied using the control unit 10; then, as the beat frequency component fb varies correspondingly, it becomes possible to discriminate which signal is the signal reflected from the target object. The frequency component fb consists of the range frequency component fr and velocity frequency component fd, of which only the range frequency component fr varies in the above case. However, since the frequency component fb varies as a whole, the signal from the target object can be discriminated.

The above embodiment has been described by dealing with the case where the present invention is applied to a two-antenna type FM-CW radar, but the invention is also applicable to a single-antenna type FM-CW radar.

Figure 11:
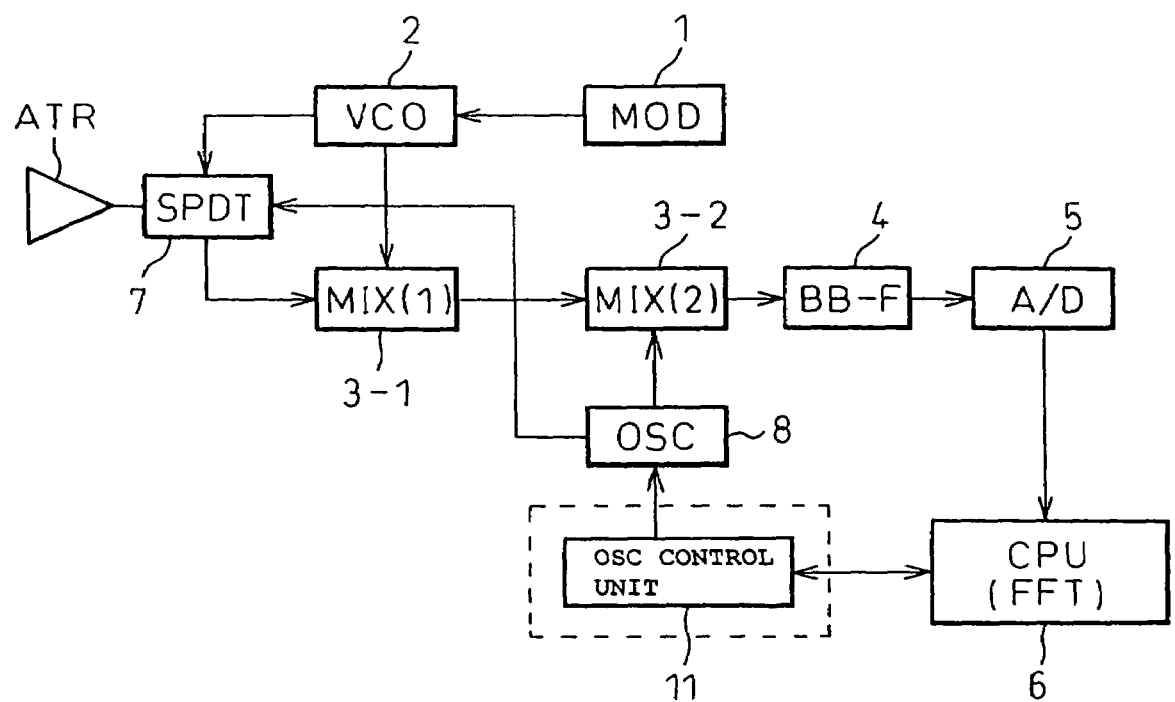
FIG. 11 is a diagram showing an embodiment of an FM-CW radar according to the present invention.

FIG. 11 is a diagram showing an embodiment of an FM-CW radar system according to the present invention. This embodiment concerns a single-antenna time division ON-OFF control type FM-CW radar to which the present invention is applied. The configuration of FIG. 11 is the same as that of FIG. 4, except for the inclusion of a modulating signal generator control unit 11 for the modulating signal generator 8. In this figure, the control unit 11, under the control of the CPU 6, variably controls the frequency (period) of the modulating signal to be output from the modulating signal generator 8. As a result, the ON-OFF frequency (period) of the transmit-receive switching device 7 changes, and the frequency applied to the second frequency converter 3-2 also changes. Since the switching frequency fsw changes, the sideband signal frequencies fsw−fr and fsw+fr shown in FIGS. 6 to 8 also change, so that the signal from the target object can be discriminated.

Figure 12:
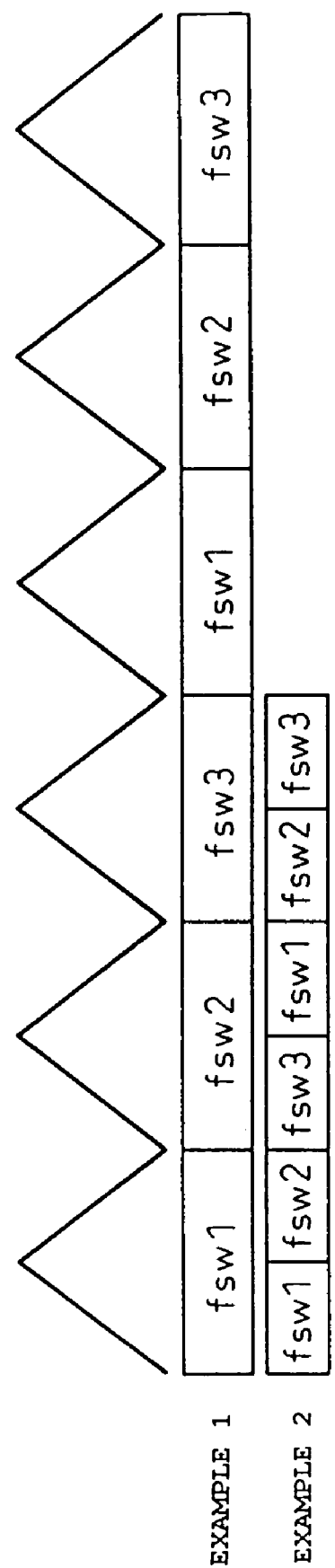
FIG. 12 is a diagram showing how the frequency output from a modulating signal generator is varied according to the present invention.

The frequency (period) of the modulating signal output from the modulating signal generator 8 is varied, for example, as shown in FIG. 12. In this case, the frequency is varied in synchronism with the triangular wave being output from the other modulating signal generator 1. In example 1 of FIG. 12, the frequency is varied as fsw1, fsw2, and fsw3 in sequence for each up/down cycle of the triangular wave. As a result, the ON-OFF switching frequency fsw changes, and fsw−fr and fsw+fr also change accordingly. On the other hand, other frequency components such as noise remain unchanged, so that the signal from the target object can be discriminated from other signals. In the above embodiment, the frequency is varied in sequence for each up/down cycle, but the frequency may be varied every plurality of up/down cycles. In the latter case, the frequency may be varied randomly.

In example 2 of FIG. 12, the frequency of the modulating signal output from the modulating signal generator 8 is varied for each half cycle (up or down) of the triangular wave. In this case, the frequency of the signal from the target object varies for each half cycle (up or down) of the triangular wave.

Figure 13:
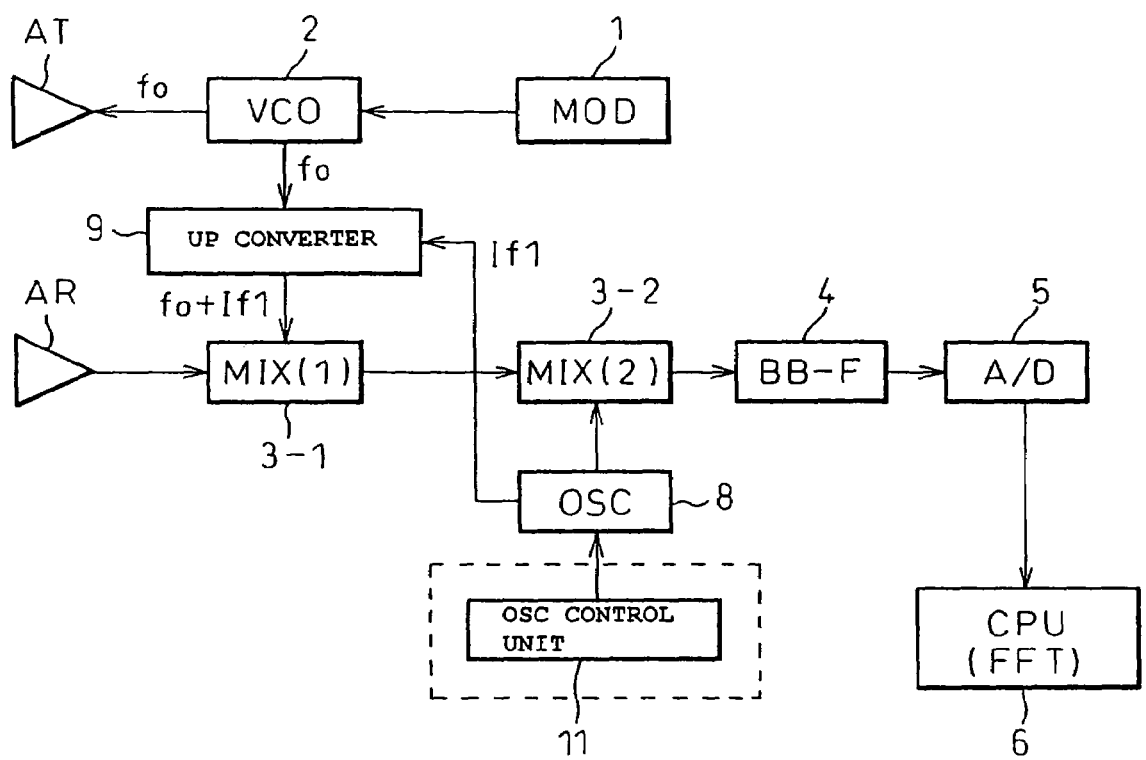
FIG. 13 is a diagram showing an embodiment of a heterodyne FM-CW radar according to the present invention.

FIG. 13 is a diagram showing a two-antenna heterodyne type FM-CW radar system. Though the radar system will be described here as being the two-antenna type, the basic principle is the same for the single-antenna type. The system shown here differs from the configuration of FIG. 11 in that two antennas, the transmitting antenna AT and the receiving antenna AR, are provided and the transmit-receive switching device is omitted because of the two-antenna system. In addition to that, an up converter 9 is provided between the voltage-controlled oscillator 2 and the first frequency converter 3-1 so that the frequency of the signal to be input to it from the modulating signal generator 8 can be controlled by the modulating signal generator control unit 11. The up converter 9 takes as inputs the signal of frequency $f_0$ from the voltage-controlled oscillator 2 and the modulating signal of frequency If1 from the modulating signal generator 8, and outputs a signal of frequency $f_0$+If1 as the local signal to the first frequency converter 3-1. In this case also, when the frequency If1 of the signal output from the modulating signal generator 8 is varied, the signal frequencies fsw(If1)−fr and fsw(If2)+fr shown in FIGS. 6 to 8 also vary, causing the beat frequency component fb to vary accordingly, so that the signal from the target object can be discriminated.

Figure 14:
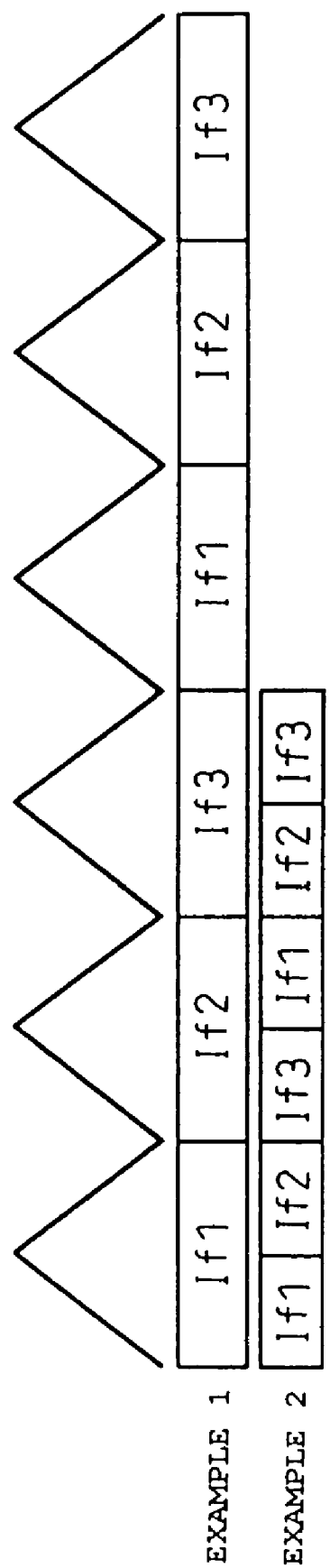
FIG. 14 is a diagram showing how the frequency output from the modulating signal generator is varied according to the present invention.

The frequency (period) of the modulating signal output from the modulating signal generator 8 is varied, for example, as shown in FIG. 14. In this case, the frequency is varied in synchronism with the triangular wave being output from the other modulating signal generator 1. In example 1 of FIG. 14, the frequency is varied as If1, If2, and If3 in sequence for each up/down cycle of the triangular wave. As a result, the signals Ifn+fr and Ifn−fr change at the output end of the first frequency converter 3-1, but since the noise frequency remains unchanged, the signal from the target object can be discriminated from other signals. In the above embodiment, the frequency is varied in sequence for each up/down cycle, but the frequency may be varied every plurality of up/down cycles. In the latter case, the frequency may be varied randomly.

In example 2 of FIG. 14, the frequency of the modulating signal output from the modulating signal generator 8 is varied for each half cycle (up or down) of the triangular wave. In this case, the frequency of the signal from the target object varies for each half cycle (up or down) of the triangular wave.

Figure 15:
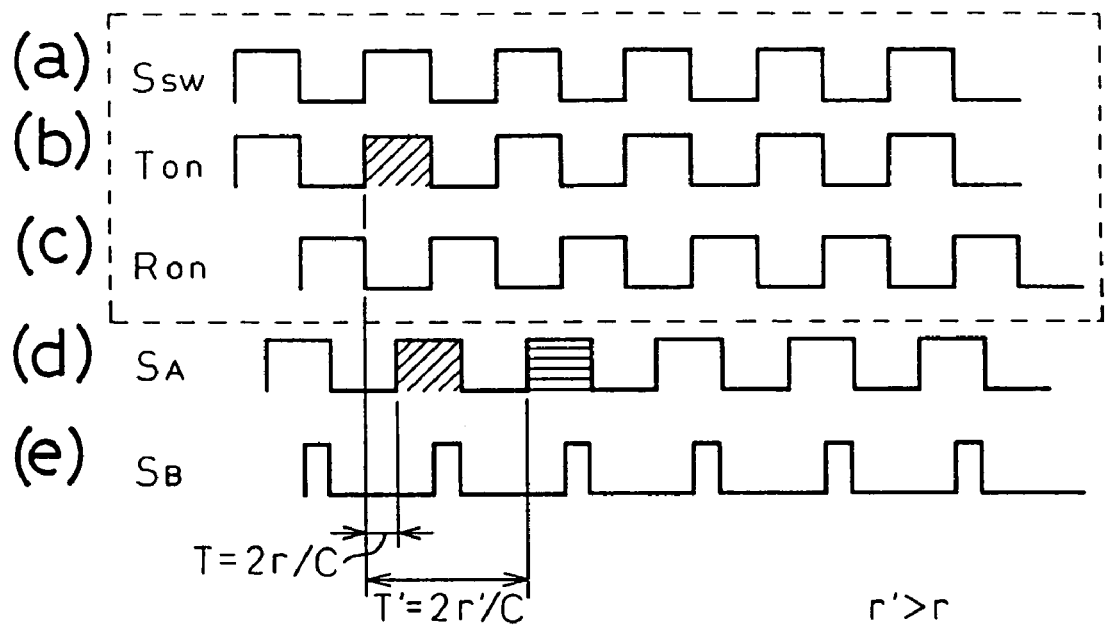
FIG. 15 is a diagram showing signal processing waveforms in a time division ON-OFF control type FM-CW radar.
Figure 16:
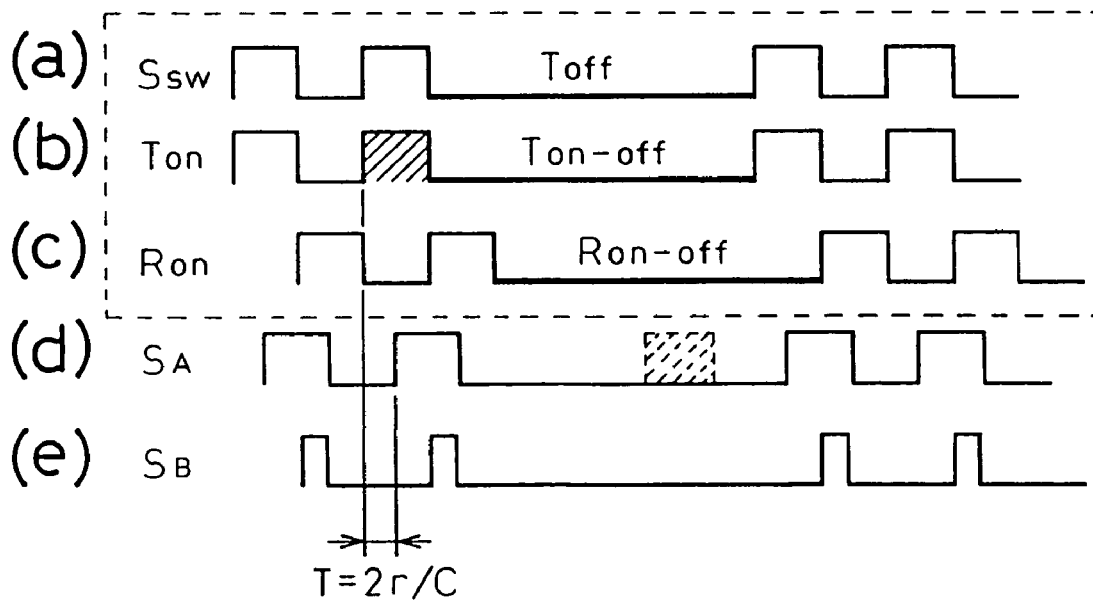
FIG. 16 is a diagram showing signal processing waveforms in the time division ON-OFF control type FM-CW radar according to the present invention.

FIGS. 15 to 16 are diagrams for explaining an embodiment in which the present invention is applied to the time division ON-OFF control type FM-CW radar. This embodiment will be described by referring to the time division ON-OFF control type FM-CW radar system shown in FIG. 11.

FIG. 15 is a diagram showing signal processing waveforms in a conventional art time division ON-OFF control type FM-CW radar. In the figure, part (a) shows a waveform defining the switching timing of the transmit-receive switching device 7; the signal Ssw shown here is output from the modulating signal generator 8. Part (b) shows a waveform Ton defining the transmission ON timing based on Ssw, and (c) a waveform Ron defining the reception ON timing based on Ssw. On the other hand, part (d) shows a waveform SA illustrating the return timing of the transmitted signal upon reflection, and (e) a waveform SB illustrating the timing for the reflected signal to be received by the radar when the reception is ON.

As can be seen, the waveform SA is delayed in timing with respect to the waveform Ton by an amount equal to the round trip time from the radar to the target object and back to the radar. For example, the time interval T between the pulse shown by oblique hatching in the waveform Ton and the pulse shown by oblique hatching in the waveform SA is 2r/C, where r is the distance between the radar and the target object and C is the velocity of light. When the target is at a far distance, the pulse shown by horizontal hatching in the waveform SA, for example, is returned for the oblique hatched pulse in the waveform Ton. The pulse time interval T' in this case is 2r'/C.

FIG. 16 is a diagram for explaining the embodiment of the present invention. In the present invention, provisions are made not to receive a reflected wave from any target other than the target object, by turning off the receiving gate when a reflected wave from a medium-range or long-range target, which is not the target object, is returned. To achieve this, in the present invention, a transmission/reception OFF period Toff is provided in the signal Ssw as shown in FIG. 16(a). This results in the formation of a transmission OFF period Ton-off and a reception OFF period Ron-off in Ton and Ron, respectively. As a result, when a signal transmitted, for example, with the timing of the oblique hatched pulse in Ton is returned by being reflected on a very distant target, a pulse shown by dashed lines appears in the waveform SA show in part (d), but at this time, as the gate of Ron is closed, the return signal is not received; in this way, the unwanted signal from the very distant target can be eliminated. By varying the transmission/reception pattern in this way, it becomes possible to suppress signal generation due to a medium-range or long-range target which is not the target object.

FIG. 17 is a diagram for explaining an embodiment of the present invention. FIG. 17(a) shows the transmitted waveform of the FM-CW radar. In the conventional art, the transmitted waveform is triangular as shown in FIG. 1(a). On the other hand, in the present invention, the transmitted wave has a nonlinear shape with the linearity of the conventional art waveform degraded as illustrated here; in the example shown, the waveform is shaped in the form of an arc to make the frequency deviation of the rectangular wave nonlinear.

FIG. 18(b) shows the transmitted and received waveforms according to the conventional art. These waveforms are the same as those shown in FIG. 1(a). In this case, the frequency difference fr between the transmitted and received waves is the same at any point in time.

In contrast, in the present invention, as the linearity of the transmitted wave is degraded, the linearity of the received wave is also degraded as shown in FIG. 17(c). As a result, the frequency difference fr between the transmitted and received waves varies with time. For example, the frequency difference fr1 in the first half of the rising portion of the wave differs from the frequency difference fr2 in the second half of the rising portion, as shown, that is, fr1>fr2. The difference between fr1 and fr2 increases with increasing distance to the target. Using this characteristic, a signal from a very distant target can be distinguished and eliminated from the target objects.

Figure 18:
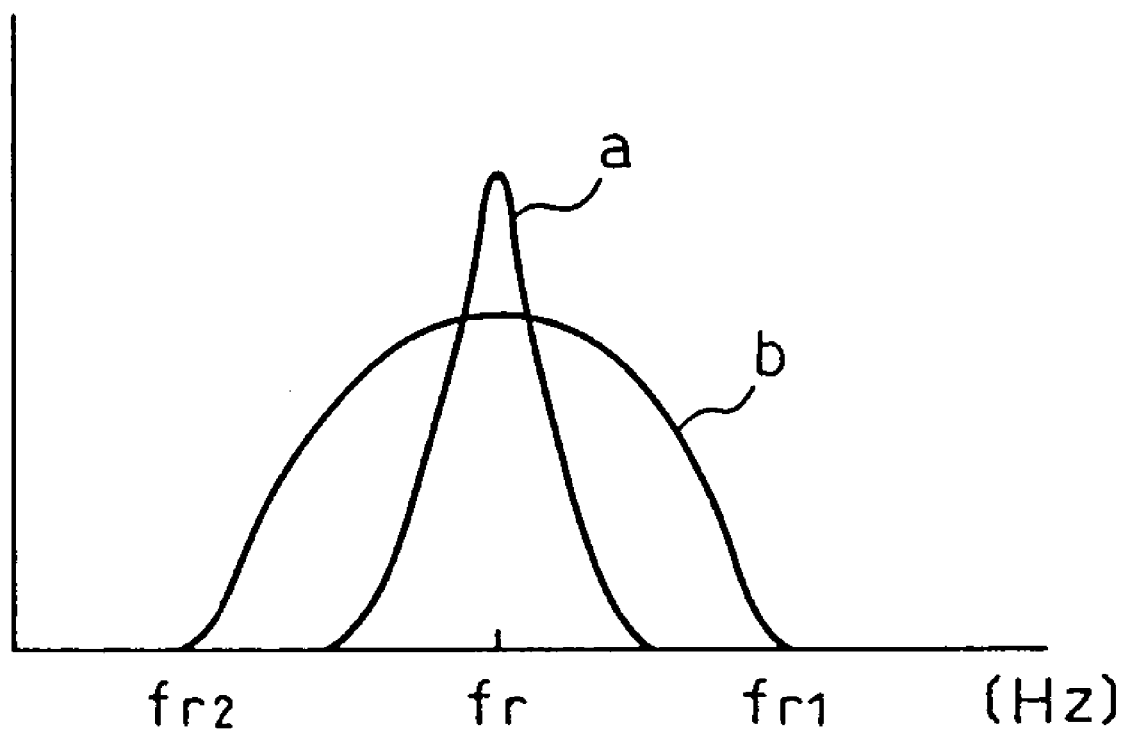
FIG. 18 is a diagram showing spectral distributions according to the embodiment of the present invention.

FIG. 18 shows frequency spectra detected. As shown, when the target is near, the spectrum exhibits a distribution such as shown by a, while when the target is distant, the spectrum exhibits a distribution such as shown by b.

Accordingly, when the detected spectrum has a distribution such as shown by b, the detected target can be determined as being a very distant target and be eliminated.

In the above embodiment, the configuration shown in FIG. 9, for example, can be used for the FM-CW radar. Further, the triangular wave need not necessarily be shaped in the form of an arc as shown above, but may be shaped in any suitable form as long as it causes a difference between fr1 and fr2.

What is claimed is:

1. A heterodyne FM-CW radar system which frequency-modulates a voltage-controlled oscillator by applying thereto a modulating signal from a first modulating signal generator, and which transmits a frequency-modulated wave and receives a reflected wave, wherein said system includes a second modulating signal generator for generating a downconverting signal (IF signal), a modulating signal generator control unit for varying the frequency of the second modulating signal generator and a signal processing unit for discriminating a signal that varies from a signal that does not vary in response to the variation of the frequency of said IF signal when said frequency is varied, wherein said signal processing unit discriminates a signal component varying in response to the variation of frequency as a signal component related to a target object, and discriminates a signal component not varying in response to the variation of frequency as a signal component not related to a target object.

2. A heterodyne FM-CW radar system as claimed in claim 1, wherein said modulating signal is a signal in the form of a triangular wave, and said means for varying the frequency of said IF signal varies said frequency for each pair of upward and downward slopes of said triangular wave or every plurality of said pairs.

3. A heterodyne FM-CW radar system as claimed in claim 1, wherein said modulating signal is a signal in the form of a triangular wave, and said means for varying the frequency of said IF signal varies said frequency for each of upward and downward slopes of said triangular wave.

* * * * *